United States Patent
Issler

(10) Patent No.: US 8,322,929 B2
(45) Date of Patent: *Dec. 4, 2012

(54) SLIDE BEARING

(75) Inventor: Wolfgang Issler, Schwaikheim (DE)

(73) Assignee: MAHLE International GmbH, Stuttgart (DE)

( * ) Notice: Subject to any disclaimer, the term of this patent is extended or adjusted under 35 U.S.C. 154(b) by 579 days.

This patent is subject to a terminal disclaimer.

(21) Appl. No.: 12/583,754

(22) Filed: Aug. 25, 2009

(65) Prior Publication Data

US 2010/0054642 A1    Mar. 4, 2010

(30) Foreign Application Priority Data

Aug. 26, 2008  (DE) .................. 10 2008 039 741

(51) Int. Cl.
*F16C 33/10*    (2006.01)
(52) U.S. Cl. .................. 384/286; 384/283; 384/291
(58) Field of Classification Search .................. 384/100, 384/107, 119–120, 123, 282, 284, 286, 292, 384/283, 289, 290–291
See application file for complete search history.

(56) References Cited

U.S. PATENT DOCUMENTS

| | | | |
|---|---|---|---|
| 627,985 A | 7/1899 | Delano | |
| 2,757,055 A * | 7/1956 | Davis | 384/284 |
| 3,961,104 A * | 6/1976 | Tanner | 427/198 |
| 4,120,544 A * | 10/1978 | Huber | 384/292 |
| 4,342,491 A * | 8/1982 | Jamison et al. | 384/286 |
| 4,474,861 A * | 10/1984 | Ecer | 384/282 |
| 4,671,676 A * | 6/1987 | Chen et al. | 384/100 |
| 4,678,348 A * | 7/1987 | Tielemans et al. | 384/292 |
| 4,961,122 A * | 10/1990 | Sakai et al. | 384/292 |
| 5,333,955 A * | 8/1994 | Papa | 384/291 |
| 5,415,476 A * | 5/1995 | Onishi | 384/114 |
| 5,908,247 A * | 6/1999 | Leuthold et al. | 384/114 |
| 6,082,904 A * | 7/2000 | Ono et al. | 384/291 |
| 6,554,474 B2 * | 4/2003 | Saito et al. | 384/107 |
| 7,090,401 B2 * | 8/2006 | Rahman et al. | 384/114 |
| 7,125,170 B2 * | 10/2006 | Kim | 384/115 |
| 7,165,889 B2 * | 1/2007 | Light et al. | 384/292 |
| 7,575,814 B2 | 8/2009 | Adam et al. | |
| 2001/0048780 A1 * | 12/2001 | Markovitch | 384/291 |
| 2003/0190101 A1 * | 10/2003 | Horng et al. | 384/278 |
| 2006/0039637 A1 * | 2/2006 | Huang | 384/114 |
| 2006/0192451 A1 | 8/2006 | Hong et al. | |
| 2006/0263000 A1 | 11/2006 | Bock et al. | |

FOREIGN PATENT DOCUMENTS

| | | |
|---|---|---|
| DE | 103 37 030 | 3/2005 |
| DE | 10 2004 028 773 | 1/2006 |
| DE | 10 2005 037 502 | 3/2007 |
| DE | 102007044249 A1 * | 3/2009 |
| DE | 102007044250 A1 * | 3/2009 |
| EP | 1 722 116 | 11/2006 |

* cited by examiner

*Primary Examiner* — Marcus Charles
(74) *Attorney, Agent, or Firm* — Collard & Roe, P.C.

(57) ABSTRACT

A slide bearing has at least one bearing shell for accommodating a component to be supported. The at least one bearing shell has two grooves that run in a circumferential direction on its slide surface, into which grooves guide elements for lubricant are laid. The grooves and the guide elements are disposed convergent to one another at least over a partial circumference of the slide surface. least one bearing shell for accommodating a component to be supported. The bearing shell has two grooves that run in the circumferential direction on its slide surface, into which grooves guide elements for lubricant are laid.

14 Claims, 2 Drawing Sheets

SLIDE BEARING

CROSS REFERENCE TO RELATED APPLICATIONS

Applicant claims priority under 35 U.S.C. §119 of German Application No. 10 2008 039 741.5 filed Aug. 26, 2008.

BACKGROUND OF THE INVENTION

1. Field of the Invention

The present invention relates to a slide bearing having at least one bearing shell for accommodating a component to be supported. The bearing shell has two grooves that run in the circumferential direction on its slide surface, into which grooves guide elements for lubricant are laid.

2. The Prior Art

A slide bearing of this type is described in German Patent No. DE 10 2004 028 773 B4 and European Patent Application No. EP 1 722 116 A1. This slide bearing is equipped with expansion or throttling elements, in order to control the size of the bearing gap between the slide surface of the bearing shell and the surface of the component to be supported, and to prevent excessive discharge of lubricant.

SUMMARY OF THE INVENTION

It is an object of the invention to provide a slide bearing of the type stated, in such a manner that even better control of the lubricant flow between the slide surface and the component to be supported is achieved.

This object is accomplished according to the invention by a slide bearing having a least one bearing shell for accommodating a component to be supported. The bearing shell has two grooves that run in the circumferential direction on its slide surface, into which grooves guide elements for lubricant are laid. The grooves and the guide elements are disposed convergent to one another at least over a partial circumference of the slide surface.

Therefore, according to the invention, the distance between the guide elements, relative to one another, is reduced at least over a partial circumference of the slide surface. An oil flow that flows between the guide elements at an increasingly raised velocity results from this, in terms of flow physics. As a result, the pressure buildup in the elastohydrodynamic contact is improved, and thus the ability of the slide bearing to withstand stress is increased, i.e. the risk of seizing is reduced.

The grooves and the guide elements can be disposed convergent to one another over the entire slide surface, but they can also be disposed to run parallel to one another at first, over a circumference angle of 10° to 90°, and then converge toward one another. In the latter case, the additional result is achieved that guide elements loosely laid into the grooves are better held by means of the inherent stress that results, and this represents a significant advantage particularly for transport and assembly of the bearing shell.

In order to achieve a uniform lubricant flow with few eddies, it is practical if the grooves and the guide elements are disposed to converge constantly toward one another.

In order to optimize the lubricant flow influenced by the guide elements, the grooves and the guide elements are preferably disposed convergent to one another in the direction of rotation of a component to be supported, which rotates during operation. A further optimization can be achieved in that two bearing shells are provided and the grooves and the guide elements are disposed in the bearing shell that is subject to less stress during operation. By means of these two measures, improved stress relief of the bearing shell subject to greater stress can be achieved.

The guide elements can end flush with the slide surface of the bearing shell and develop their effect by means of thermal expansion during operation. However, at least a section of the guide elements can also project radially beyond the slide surface of the bearing shell, so that no thermally expandable material is required for the guide elements. For this purpose, the grooves can be made along the circumference of the slide surface at a changeable depth, and the guide elements can have a constant radial thickness. Vice versa, however, the grooves can also be made with a constant depth along the circumference of the slide surface, and the guide elements can have a radial thickness that changes over their length.

It is advantageous if the guide elements have a guide groove for lubricant at least in their surface that faces the component to be supported, in order to counter the lubricant that is flowing away with an additional flow resistance. If the at least one guide groove is structured to run in a spiral shape, it is possible to convey the exiting lubricant back into the slide bearing.

The grooves and/or the guide elements can have a square, rectangular, or trapezoid cross-section, depending on the requirements of an individual case. The guide elements preferably consist of a polymer material.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 5b shows a side view of the guide element according to FIG. 5a; and

FIG. 5c shows a top view of the guide element according to FIG. 5a.

DETAILED DESCRIPTION OF THE PREFERRED EMBODIMENT

Figure 2:
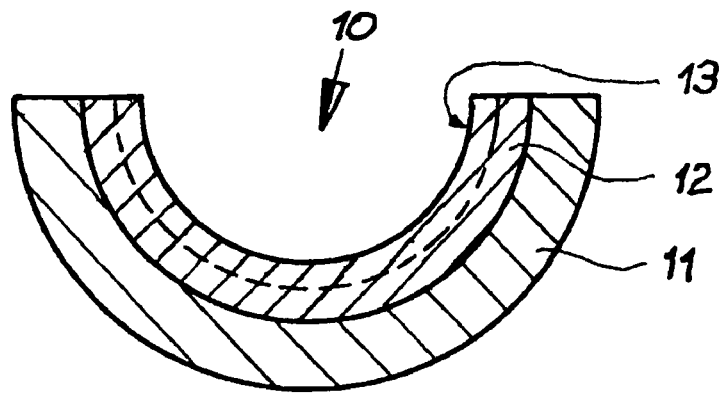
FIG. 2 shows a section along the line II-II in FIG. 1.
Figure 1:
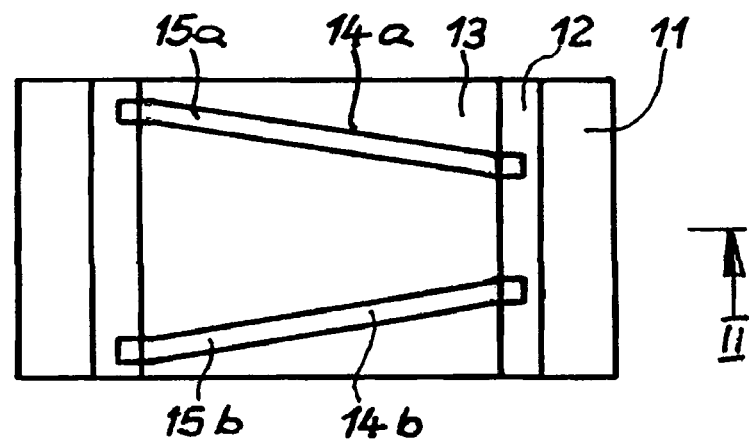
FIG. 1 shows a top view of a first exemplary embodiment of a bearing shell of a slide bearing according to the invention.

Referring now in detail to the drawings and, in particular, FIGS. 1 and 2 show a first embodiment of a bearing shell 10 for a slide bearing according to the invention. The structure of slide bearings is known and has been described, for example, in German Patent Application No. DE 103 37 030 A1. A slide bearing generally consists of a layer composite that is shown in FIG. 2, for reasons of clarity, as a uniform carrier layer 11, and ends, in the direction of the component to be supported, with a slide layer 12 that has a slide surface 13. Slide surface 13 is provided, along its circumference, with two grooves 14a, 14b that run in the circumference direction, in which groove guide elements 15a, 15b are accommodated. Guide elements 15a, 15b consist of a polymer material, for example on the basis of polytetrafluoroethylene.

According to the invention, guide elements 15a, 15b are laid into grooves 14a, 14b in such a manner that the surfaces of guide elements 15a, 15b end flush with slide surface 13. The guide elements 15a, 15b therefore develop their effect in lubricant control by means of thermal expansion during operation of the slide bearing. Furthermore, the grooves 14a, 14b and the guide elements 15a, 15b accommodated in them are disposed in such a manner that they are disposed convergent to one another over the entire circumference of the slide surface 13.

In the exemplary embodiment, two bearing shells form a slide bearing for a component to be supported, which rotates during operation, for example a crankshaft. In this embodiment, grooves 14a, 14b and thus guide elements 15a, 15b are disposed convergent to one another in the direction of rotation of the component, specifically in bearing shell 10 that is subject to less stress. In this manner, improved stress relief of the bearing shell that is subject to greater stress and lies on the opposite side is achieved, in that an oil flow at greater speed is produced for this bearing shell, which flow improves a pressure buildup in the elastohydrodynamic contact, and thus increases the ability of this bearing shell to withstand stress, i.e. reduces the risk of seizing.

Figure 3:
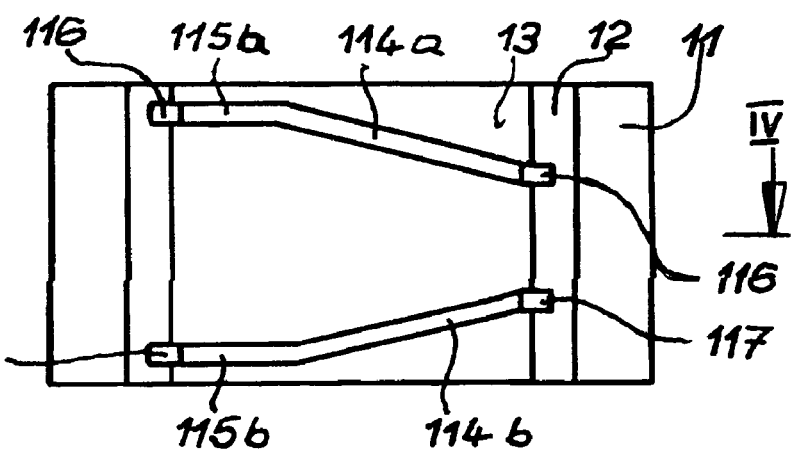
FIG. 3 shows a top view of another exemplary embodiment of a bearing shell of a slide bearing according to the invention.
Figure 4:
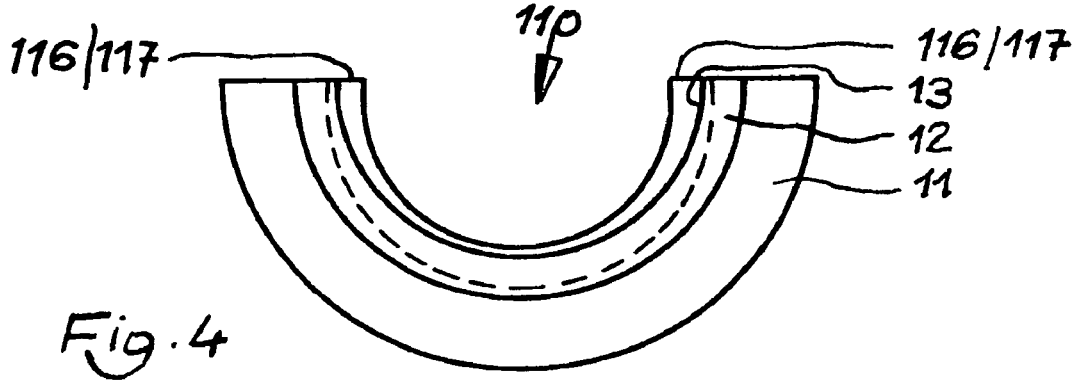
FIG. 4 shows a section along the line IV-IV in FIG. 3.

FIGS. 3 and 4 show another embodiment of a bearing shell 110 for a slide bearing according to the invention, in a representation that corresponds to FIGS. 1 and 2. Components that agree with one another are therefore provided with the same reference symbols. A slide layer 12 having a slide surface 13 is applied to a carrier layer 11, which is shown as being uniform. Slide surface 13 is provided with two grooves 114a, 114b that run along its circumference, in which grooves guide elements 115a, 115b, for example made of a polymer material, are accommodated.

According to the invention, grooves 114a, 114b and guide elements 115a, 115b accommodated in them are disposed in such a manner that they are disposed to run parallel to one another over a circumference angle of about 60°. Subsequently, grooves 114a, 114b and guide elements 115a, 115b accommodated in them run convergent to one another over the remaining circumference of slide surface 13.

In the embodiment shown, two bearing shells form a slide bearing for a component to be supported, which rotates during operation, for example a crankshaft. In this embodiment, the grooves 114a, 114b and thus the guide elements 115a, 115b are disposed convergent to one another in the direction of rotation of the component, specifically in the bearing shell 110 that is subject to less stress. In this manner, improved stress relief of the bearing shell that is subject to greater stress and lies on the opposite side is achieved, in that an oil flow at greater speed is produced for this bearing shell, which flow improves a pressure buildup in the elastohydrodynamic contact, and thus increases the ability of this bearing shell to withstand stress, i.e. reduces the risk of seizing. Furthermore, guide elements 115a, 115b loosely laid into grooves 114a, 114b are better held by the inherent stress that is thereby achieved, and this represents a significant advantage particularly for the transport and assembly of bearing shell 110.

Guide elements 115a, 115b are laid into grooves 114a, 114b in such a manner that end sections 116, 117 of guide elements 115a, 115b, which are subject to greater stress during operation, project radially beyond slide surface 13 of bearing shell 110. For this purpose, slide surface 13 is provided with grooves 114a, 114b that have a changeable depth along the circumference of slide surface 13, specifically flatter in the end regions than in the center region of slide surface 13. Guide elements 115a, 115b, in contrast, have a constant radial thickness.

Figure 5A:
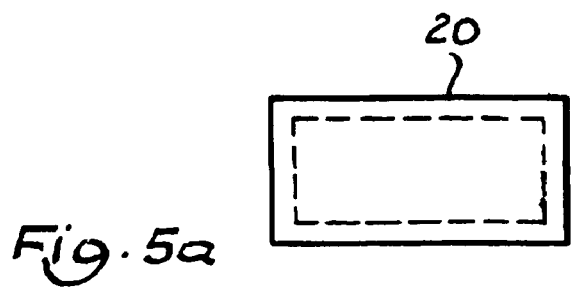
FIG. 5a shown a representation of the cross-section of a guide element.
Figure 5B:
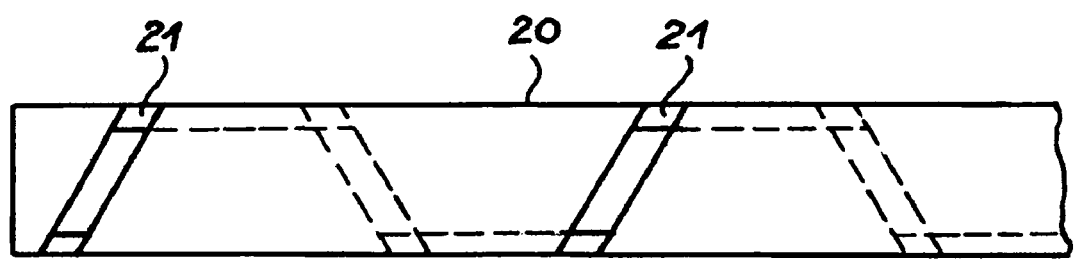
Figure 5C:
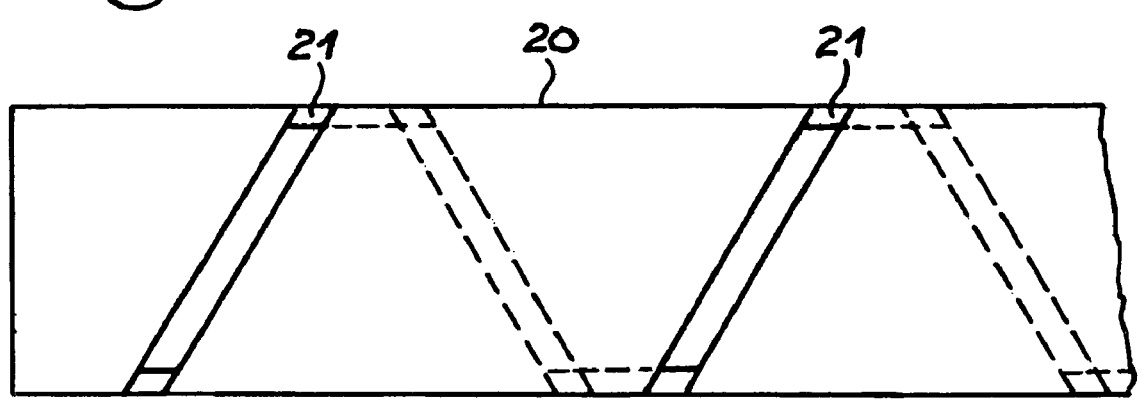

FIGS. 5a, 5b, 5c show a preferred exemplary embodiment of another guide element 20 made of a polymer material, for example on the basis of polytetrafluoroethylene. In this embodiment, guide element 20 has a rectangular cross-section. Guide element 20 is furthermore provided with a guide groove 21 that runs in a spiral shape. Guide groove 21 brings about the result that an additional flow resistance counters the lubricant that is flowing away. Furthermore, because of the spiral-shaped configuration of guide groove 21, it is possible to convey the exiting lubricant back into the slide bearing. Of course, guide element 20 can be provided with one or more guide grooves only in its surface 22 that faces the component to be supported (not shown).

Accordingly, while only a few embodiments of the present invention have been shown and described, it is obvious that many changes and modifications may be made thereunto without departing from the spirit and scope of the invention.

What is claimed is:

1. A slide bearing comprising:
at least one bearing shell for accommodating a component to be supported, at least one of said at least one bearing shell having two grooves that run in a circumferential direction on its slide surface; and
a plurality of guide elements for lubricant, said guide elements being laid into said guide grooves,
wherein the grooves and the guide elements are disposed convergent to one another over at least a partial circumference of the slide surface.

2. The slide bearing according to claim 1, wherein the grooves with their corresponding guide elements are disposed to converge toward one another over an entire circumference of the slide surface.

3. The slide bearing according to claim 1, wherein the grooves with their corresponding guide elements run parallel to one another over a circumference angle of 10° to 90°.

4. The slide bearing according to claim 1, wherein the grooves with their corresponding guide elements are disposed to converge constantly toward one another.

5. The slide bearing according to claim 1, wherein the grooves with their corresponding guide elements are disposed to converge toward one another in a direction of rotation of a component to be supported.

6. The slide bearing according to claim 1, wherein two bearing shells are provided, and wherein the grooves and the guide elements are provided in the bearing shell that is subject to less stress during operation than the other bearing shell.

7. The slide bearing according to claim 1, wherein the guide elements end flush with the slide surface of the bearing shell.

8. The slide bearing according to claim 1, wherein at least one section of each of the guide elements projects radially beyond the slide surface of the bearing shell.

9. The slide bearing according to claim 8, wherein the grooves are made along the circumference of the slide surface at a changeable depth, and wherein the guide elements have a constant radial thickness.

10. The slide bearing according to claim 8, wherein the grooves are made along the circumference of the slide surface at a constant depth, and wherein the guide elements have a radial thickness that changes over their length.

11. The slide bearing according to claim 1, wherein the guide elements have at least one guide groove for lubricant at least in their surface that faces the component to be supported.

12. The slide bearing according to claim 11, wherein the at least one guide groove is configured to run in spiral shape.

13. The slide bearing according to claim 1, wherein at least one of the grooves and the guide elements have a square, rectangular, or trapezoidal cross-section.

14. The slide bearing according to claim 1, wherein the guide elements consist of a polymer material.

* * * * *